United States Patent [19]

Ball

[11] Patent Number: 5,021,526

[45] Date of Patent: Jun. 4, 1991

[54] ANIONIC POLYMERIC STABILIZERS FOR OIL-IN-WATER EMULSIONS

[75] Inventor: Lawrence E. Ball, Akron, Ohio

[73] Assignee: The Standard Oil Company, Cleveland, Ohio

[21] Appl. No.: 492,413

[22] Filed: Mar. 5, 1990

Related U.S. Application Data

[60] Continuation of Ser. No. 214,791, Jul. 5, 1988, abandoned, which is a continuation-in-part of Ser. No. 26,583, Mar. 17, 1987, abandoned, which is a division of Ser. No. 706,229, Feb. 27, 1985, abandoned.

[51] Int. Cl.$^5$ .............................................. C08F 30/04
[52] U.S. Cl. .................................... 526/240; 526/260; 526/264; 526/274; 526/278; 526/287; 526/303.1; 526/307.2; 526/307.6; 526/307.7
[58] Field of Search ............... 526/240, 260, 264, 274, 526/278, 287, 303.1, 307.2, 307.6, 307.7

[56] References Cited

U.S. PATENT DOCUMENTS

| | | | |
|---|---|---|---|
| 2,816,882 | 12/1957 | Schiller | 526/307.7 |
| 2,892,788 | 6/1959 | Stewart et al. | 252/51.5 |
| 3,691,124 | 9/1972 | Barron | 524/801 |
| 3,806,485 | 4/1974 | Frisque | 524/506 |
| 4,242,247 | 12/1980 | Pellon et al. | 523/337 |
| 4,267,103 | 5/1981 | Cohen | 526/307.6 |
| 4,301,266 | 11/1981 | Muenster et al. | 526/307.6 |
| 4,395,524 | 7/1983 | Emmons et al. | 526/307.2 |
| 4,395,525 | 7/1983 | Fischer et al. | 526/307.6 |
| 4,423,199 | 12/1983 | Chang et al. | 526/307.6 |
| 4,425,326 | 1/1984 | Guillon et al. | 526/307.6 |
| 4,432,881 | 2/1984 | Evani | 252/8.5 A |

FOREIGN PATENT DOCUMENTS

| | | | |
|---|---|---|---|
| 0115213 | 8/1984 | European Pat. Off. | |
| 0120265 | 10/1984 | European Pat. Off. | 526/307.6 |
| 0095545 | 7/1983 | Japan | 526/307.6 |

*Primary Examiner*—Joseph L. Schofer
*Assistant Examiner*—J. M. Reddick
*Attorney, Agent, or Firm*—D. P. Yusko; D. J. Untener; L. W. Evans

[57] ABSTRACT

A terpolymer mixture having emulsifying and emulsion stabilizing properties comprising a mixture of (1) a water soluble vinyl monomer, (2) a water insoluble vinyl monomer having 12 to 30 carbon atoms and (3) a polymerizable vinyl monomer containing acid groups. The terpolymer may be used in combination with oil and water to form stable oil-in-water emulsions or in enhanced oil recovery procedures.

3 Claims, No Drawings

ANIONIC POLYMERIC STABILIZERS FOR OIL-IN-WATER EMULSIONS

REFERENCE TO RELATED APPLICATIONS

This is a continuation of Ser. No. 214,791 filed Jul. 5, 1988, now abandoned which is a continuation-in-part of application Ser. No. 026,583, filed Mar. 17, 1987, now abandoned, which was a divisional of application Ser. No. 706,229 filed Feb. 27, 1985, now abandoned.

BACKGROUND OF THE INVENTION

The present invention is directed to novel terpolymers emulsion stabilizers for oil-in-water emulsions. In particular, the present invention is directed to the use of terpolymers of water soluble vinyl monomers and water insoluble vinyl monomers having long chain alkyl groups and polymerizable vinyl monomers containing acid groups useful in the formation of stable oil-in-water emulsions. The emulsion stabilizers of the present invention have specific utility in cleaning oil contaminated vessels, oil spill management, pipeline transportation of heavy crude oil drag reduction in pipeline pumping of oil, and enhanced oil recovery by chemical flooding.

The use of ordinary surfactants or emulsifiers to produce stable oil-in-water emulsions has been attempted in the prior art. Ordinary surfactants, generally, are compounds which have a low molecular weight (e.g. less than 30 carbon atoms) and contain hydrophilic (water-loving) and lipophilic (oil-loving) groups. When a mixture of oil and water is mechanically sheared in the presence of these types of surfactants, the surfactants distribute themselves at the oil-water interface as the droplets of oil are formed thus facilitating the formation of an oil-in-water emulsion. Because of the faster mobility of the low molecular weight surfactants, they are quite effective in forming an initial emulsion of the oil and water. However, when the mechanical shear is removed and the emulsion is allowed to stand for some time (i.e. a few hours, days) most emulsions made from this type of surfactant tend to separate. The reason attributed to the separation is that the mobility of the surfactants are such that they move in and out of the surface of the oil droplets leaving some surface area of the oil droplets exposed. Accordingly, when two oil droplets collide at an exposed site, coalescence of the droplets occurs. As time goes on, larger and larger droplets of oil are formed resulting in the separation of the oil phase from the water phase. Accordingly, to stabilize the oil-in-water emulsions the use of a material which is not mobile would be highly desirable.

In U.S. Pat. No. 4,311,832 to Gutnick et. al., a naturally occurring long chained material suitable for emulsions stabilization of oil-in-water emulsions is disclosed. The material is identified as "EMULSAN". The emulsion stabilizer properties of "EMULSAN" arise from its unique structure which consists of a large molecular weight molecule containing both hydrophilic and lipophilic groups. The large molecular weight of the emulsan molecule is such that once the molecules have positioned themselves at the oil water interface they tend to stay there resulting in a highly stable emulsion. While emulsions produced by the use of "EMULSAN" have exhibited high stability they are produced by biotechnological procedures which are relatively inflexible. Accordingly, the "EMULSAN" product cannot be easily modified because of its dependence on bacteria to make the product. Therefore, the use of a synthetic high molecular weight material as a emulsion stabilizer would be preferable because it could be modified or produced by various procedures giving the resulting molecule various properties not possessed by the biotechnological product.

Synthetic polymeric materials having emulsifying properties can be found in the prior art. For example, U.S. Pat. No. 2,816,882 to Schiller discloses polymeric surface active agents comprising copolymers of acrylamide or methacrylamide and acrylic or methacrylic acid esters of a higher molecular weight saturated aliphatic alcohol having at least 8 carbon atoms. In addition, U.S. Pat. Nos. 3,691,124 and 4,464,508 disclosed copolymers of acrylamides for use in water-in-oil emulsion stabilization. Finally, U.S. Pat. Nos. 4,463,151 and 4,463,152 disclose acrylamide acrylate copolymers as viscosification agents. Applicant's invention is directed to terpolymers containing water soluble vinyl monomers and water insoluble vinyl monomers having long chain alkyl groups (C=12-20) and vinyl monomers containing acid groups and their use as emulsifiers and emulsion stabilizers for oil-in-water emulsions.

SUMMARY OF THE INVENTION

It is the object of the present invention to provide a novel polymeric emulsion stabilizer composition capable of producing stable oil-in-water emulsion.

It is a further object of the present invention to provide a novel polymer emulsion stabilizer composition suitable for use with low molecular weight surfactants.

It is another object of the present invention to provide a novel stable oil-in-water emulsion.

It is still another object of the present invention to provide a polymer possessing emulsifying and emulsion stabilizing properties for use in production of a stable oil-in-water emulsion.

For purposes of this invention the term oil is understood to mean a wide range of materials. For example, the term is intended to include mineral oil, vegetable oil, animal oils, etc. Preferably, the present invention is directed to oils that are naturally occurring hydrocarbons and in particular normal crude oil, heavy crude oil and viscous refinery products.

In order to better clarify the terms "heavy crude" and "viscous refinery products," initially, it should be understood that there is no universally accepted, clear-cut definition for heavy crudes. In the context of the present invention, "heavy" and "viscous" will be considered synonymous. While low API gravity, i.e., high density, does not necessarily coincide with high viscosity, these characteristics are almost always correlated. Similar statements apply to what is referred to as "viscous refinery products," which for purposes of the present invention should be taken to include any viscous, usually high-density, liquid or semi-solid material remaining following the refining process. Vacuum resid and asphalt are primary examples of such materials. The following characteristics usually are considered typical of these hydrocarbons:

1. Low API gravity, generally at or below 20°. This is the most frequently used criterion, both because it is easily measured and because 20° crude roughly corresponds to the lower limit recoverable with conventional production techniques.
2. Viscosities in the range of $10^2$ to $10^6$ centipoises (cp) or even higher in some cases.

3. High metal contents. For example, heavy crudes often have nickel and vanadium contents as high as 500 ppm. Resids can sometimes be even higher in metals.
4. High sulfur content, e.g., 3 weight percent or more, especially for vacuum bottoms.
5. High asphaltene content.

Additional objects, advantages and novel features of the invention will be set forth in part in the description that follows and in part will become apparent to those skilled in the art upon examination of the following or may be learned by practicing the invention. The object and advantages of the invention may be realized and obtained by means of the instrumentalities and combinations particularly pointed out in the appended claims.

To achieve the foregoing and other objects in accordance with the purpose of the present invention as embodied and broadly described herein, the emulsion stabilizer and/or emulsifying terpolymer of the present invention comprises a mixture of (1) a water soluble vinyl monomer, (2) a water insoluble vinyl monomer having an alkyl chain containing about 12 to 30 carbon atoms and (3) a polymerizable vinyl monomer containing an acid group or its water soluble salt such as Na, K or $NH_4$.

In another aspect of the present invention, the method of producing a stable oil-in-water emulsion comprising mixing water, oil and a terpolymer comprising a mixture of (1) a water soluble vinyl monomer, (2) a water insoluble vinyl monomer having an alkyl chain containing about 12 to 30 carbon atoms and (3) a polymerizable vinyl monomer containing an acid group or its water soluble salt such as Na, K or $NH_4$.

In still another aspect of the present invention, a method is provided for cleaning oil contaminated vessels comprising mixing the terpolymer of the present invention with water to dissolve the terpolymer in the water and applying the water-terpolymer mixture to the surface of the oil contaminated vessel to remove the oil from the surface of the vessel. The oil removed from the surface of the vessel mixes with the terpolymer-water mixture to form a stable oil-in-water emulsion which can be readily removed from the vessel.

In a further aspect of the present invention, the stable oil-in-water emulsion of the present invention comprises oil, water and a terpolymer comprising a mixture of (1) a water soluble vinyl monomer, (2) a water insoluble vinyl monomer and (3) a polymerizable vinyl monomer containing acid groups or its water soluble salt such as Na, K or $NH_4$.

In a preferred embodiment of the present invention, the stable oil-in-water emulsion of the present invention includes a low molecular weight surfactant. The term low molecular weight surfactant refers to any conventional surfactant known to anyone having ordinary skill in the art. Illustrative of these known surfactants are petroleum sulphonates.

The terpolymers of the present invention produce oil-in-water emulsions that are extremely stable and relatively insensitive to brine content. Accordingly, unlike other oil-in-water emulsions utilizing low molecular weight materials, the emulsions of the present invention remains stable for extremely long periods of time (e.g., weeks, months). In addition, in contrast to the oil-in-water emulsions of U.S. Pat. No. 4,311,832, the polymeric material used in the oil-in-water emulsion of the present invention can be changed quite easily (i.e., changing the starting materials). Accordingly, the synthetic emulsifier and emulsion stabilizer of the present invention may be tailored to possess the properties desired. Moreover, the anionic characteristics of these terpolymers will enhance the solubility of these polymers in water.

DETAILED DESCRIPTION OF THE INVENTION

The novel water soluble terpolymers of the present invention used in forming the stable oil-in-water emulsions of the present invention comprise a mixture of (1) a water soluble vinyl monomer, (2) a water insoluble vinyl monomer having an alkyl chain containing about 12 to 30 carbon atoms and (3) a polymerizable vinyl monomer having an acid group or its water soluble salt (e.g., Na, K, Ca or $NH_4$). Preferably, the terpolymers of the present invention comprise a mixture of (1) acrylamide or methacrylamide, (2) long chain ($C_{12}$-$C_{22}$) alkyl acrylate or methacrylate esters, and (3) an ethylenically unsaturated carboxylic acid.

The production of the terpolymer of the present invention employs a monomeric mixture of three monomers each in certain proportions. The first being a monomeric water soluble vinyl compound. The second being a monomeric water insoluble vinyl compound having an alkyl chain containing about 12 to 30 carbon atoms. The third being a polymerizable vinyl monomer containing an acid group or its water soluble salt. Typically, the proportions of each monomer should be 10 to 50 weight % acid containing vinyl monomer, 0.1 to 20% water insoluble vinyl monomer and 30 to 85 weight % water soluble vinyl monomer. Preferably, the proportions of each monomer in the mixture should be 20 to 35 weight % acid containing vinyl monomer, 1 to 15 weight % water insoluble monomer and 50 to 75 weight % water soluble monomer.

The water soluble vinyl monomer can be chosen from the group consisting of acrylamide and methacrylamide, vinyl methyl ether, N-methyl acrylamide, N,N-dimethylacrylamide, N-methacryloylglycinamide, vinyl pyrrolidone, and N-vinyloxazolidone.

The water insoluble vinyl monomer can be chosen from the group consisting of long chain ($C_{12}$ to $C_{30}$) alkyl acrylate esters, long-chain N alkyl acrylamides or methacrylamides, long chain vinyl esters and long chain vinyl ethers. Preferably, the water insoluble monomer is long chain alkyl acrylate ester having the formula:

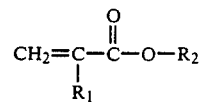

wherein $R_2$ is an alkyl group containing 12 to 30 carbon atoms, preferably 12 to 22 carbon atoms and $R_1$ is hydrogen or methyl. Typical monomers falling within this general class are, lauryl methacrylate, stearyl methacrylate and others. Typical monomers of the long-chain N-alkyl acrylamide class include N-octadecyl acrylamide, N-octadecyl methacrylamide, and N,N-dioctyl acrylamide.

The polymerizable vinyl monomer may be selected from ethylenically unsaturated carboxylic acid such as acrylic and methacrylic acid, sulfonic acids such as AMPS (2-acrylamido-2-methyl propane sulfonic acid) or styrene sulfonic acid and vinyl phosphates such as vinyl phosphonic acid or their water soluble salts.

Most preferably, the ethylenically unsaturated carboxylic acid are used. Typical examples of these types of materials include acrylic acid, methacrylic acid, fumaric acid, itaconic acid, citraconic acid, aconitic acid, etc.

Preferably, the terpolymer of the present invention is made by polymerization in an inert diluent having some solubilizing action on one or more of the monomeric ingredients but substantially none on the resultant polymer. Polymerization in mass may be employed but is not preferred because of the difficulty in working up the solid polymeric masses obtained. Polymerization in an aqueous medium containing a water-soluble free radical catalyst peroxygen is useful, the product being obtained either as a granular precipitate or as a highly swollen gel, either of which may be used directly or are easily further subdivided and dried. Most preferably, polymerization takes place in an organic liquid which is solvent for the monomers but a non-solvent for the polymer, or in a mixture of such solvents, in the presence of a solvent-soluble catalyst because the product is usually obtained as a very fine friable and often fluffy precipitate which, after solvent removal, seldom required grinding or other further treatment before use. Solvents for the latter method include benzene, xylene, Tetralin, hexane, petane, carbon tetrachloride, methyl chloride, ethyl chloride, methyl ethyl ketone, acetone, acetonitrile, ethylene dichloride, and mixtures of these and other solvents.

In addition, other known polymerization techniques such as inverse emulsion polymerization as disclosed in U.S. Pat. Nos. 3,284,393 to Vanderhoff et al and 3,624,019 to Anderson and Frisque may be utilized in the production of the terpolymers of the present invention. The disclosure of these patents is herein incorporated by reference.

Polymerization in the diluent medium is carried out in the presence of a free radical catalyst in a closed vessel in an inert atmosphere and other autogenous pressure or artificially-induced pressure or in an open vessel under reflux at atmospheric pressure. Temperature of the polymerization may be varied from 0° C. to 100° C., depending to a large degree on the molecular weight desired in the polymer and the initiator chosen. Polymerization under reflux at 50° C. to 90° C. under atmospheric pressure using a free radical catalyst is generally effective in bringing a polymer yield of 75% to 100% in less than 10 hours. Suitable catalysts include peroxygen compounds such as sodium, potassium and ammonium persulfates, carpylyl peroxide, benzoyl peroxide, hydrogen peroxide, pelargonyl peroxide, cumene hydroperoxides, tertiary butyl diperphthalate, tertiary butyl perbenzoate, sodium peracetate, sodium percarbonate, and the like as well as 2,2-azobisisobutyronitrile (AIBN). Other catalysts utilizable are the so-called "redox" type of catalyst and the heavy-metal activated catalyst systems.

EMULSION FORMATION

The stable oil-in-water emulsions of the present invention are produced by a method comprising placing a terpolymer, oil and water in a container and mixing the components to form the stable emulsion. Due to the extreme stability of the oil-in-water emulsions of the present invention, they are useful in oil spill management, pipeline transportation of normal or heavy crude, and cleaning of oil contaminated vessels. The polymeric material used in the present invention is characterized as both an emulsifier and emulsion stabilizer because it not only has the ability to emulsify the oil and water but to stabilize the oil and water once the emulsion has been formed.

In a preferred embodiment of the present invention, the terpolymer is predissolved in the water prior to mixing with the oil. This procedure facilitates dissolution of the terpolymer and decreases the time required to mix the components to form the oil-in-water emulsion.

This procedure is especially preferred in cleaning oil contaminated vessels. For example, the terpolymer of the present invention, including low molecular weight surfactant if present, is mixed with water to dissolve the terpolymer and surfactant. This mixture is then applied usually with pressure (e.g., spray apparatus or hose) to the surface of the oil contaminated vessel to remove the oil and form a stable oil-in-water emulsion. The resulting stable oil-in-water emulsion can be removed from the vessel by conventional means known in the art leaving a substantially clean surface.

The length of time required to mix the components to form the resulting stable emulsion of the present invention is not critical. However, mixing should be performed for a time sufficient to insure uniform dispersion of the terpolymer throughout the solution in order that the terpolymer molecules move to the oil water interface. For example, in the case of forming the stable emulsion with a predissolved terpolymer, mixing for 20 minutes would be sufficient.

Most preferably, the oil-in-water emulsion of the present invention contains a conventional low molecular weight surfactant to facilitate the formation of the emulsion. The use of a low molecular weight surfactant reduces substantially the time required to form the emulsion because the conventional surfactant is highly mobile. Therefore, during mixing of the components, the conventional surfactant distributes itself rapidly at the oil-in-water interface as the droplets of oil are formed. The polymeric emulsifier and emulsion stabilizer then distributes itself about the oil droplets to stabilize the already formed oil-in-water emulsion. Any conventional low molecular weight surfactant compatible with the polymeric emulsifier and emulsion stabilizer may be utilized in the practice of this embodiment of the present invention. For example, the petroleum or alkylaryl sulphonate surfactants such as those described in *Recent Advances in Surfactant Flooding*, Mattax C. C., Proceeding World Petroleum Congress, 1983, 11 (3) Pg. 205 (1084), herein incorporated by reference, may be utilized in the practice of the present invention.

In a preferred embodiment of the present invention, the oil-in-water emulsion comprises up to about 80 weight % oil, 0.1 to 5 weight % terpolymer, and the remainder being water. Most preferably, the oil-in-water emulsion comprises up to about 70 weight % oil, 0.1–3 weight % terpolymer, and remainder being water.

In an especially preferred embodiment of the present invention, a low molecular weight surfactant is used in combination with the terpolymer and the sum of both terpolymer and low molecular weight surfactant in the emulsion is between about from 0.1 to 5 weight % and preferably 0.1 to 3 weight %.

In addition to forming stable oil-in-water emulsions, the terpolymers of the present invention may also be utilized in enhanced oil recovery procedures heretofore reserved for aqueous solution of polyacrylamide, polysaccharides and ethylene polyoxides. The terpolymer of the present invention when placed in water improves the sweep efficiency of the water thereby increasing the amount of oil recovery. For a more detailed description of the use of polymers in enhanced oil recovery, see Latil, *Enhanced Oil Recovery*, Gulf Publishing Co., 1980 herein incorporated by reference.

The oil-in-water emulsions of the present invention possess extremely good stability due to the emulsion stabilization properties of the terpolymer of the present invention. The use of a combination of a conventional surfactant and a polymeric surfactant of the present invention provides an extremely good result. The conventional emulsifier facilitates the formation of emulsions, while the polymeric surfactant stabilizes them.

The foregoing description of the preferred embodiments of the present invention has been presented for purposes of illustration and description. It is not intended to be exhaustive or to limit the invention to the precise form disclosed, and obviously many modifications and variations are possible in light of the above disclosure. The embodiments were chosen and described in order to explain best the principle of the invention and its practical applications to thereby enable others skilled in the art to best utilize the invention in its various embodiments and with various modifications as are suited to the particular use contemplated. It is intended that the invention be defined by claims appended hereto.

What is claimed as the invention is:

1. A water soluble terpolymer having emulsifying and emulsion stabilizing properties consisting essentially of the polymerized mixture of (1) 30 to 85 weight percent of a water soluble vinyl monomer selected from the group consisting of acrylamide, methacrylamide, vinyl methyl ether, N-methyl acrylamide, N,N-dimethylacrylamide, N-methacryloylglycinamide, vinyl pyrrolidone, and N-vinyloxazolidone, (2) 0.1 to 20 weight percent of a water insoluble vinyl monomer having an alkyl chain containing about 12 to 30 carbon atoms selected from the group consisting of alkyl acrylate esters, vinyl esters and vinyl ethers, and (3) 10 to 50 weight percent of a polymerizable vinyl monomer containing an acid group or its water soluble salt selected from the group consisting of ethylenically unsaturated carboxylic acids, sulfonic acids, vinyl phosphonic acids, and the sodium, lithium, calcium or ammonium water soluble salts of these carboxylic acids, sulfonic acids and vinyl phosphonic acids.

2. The terpolymer of claim 1 wherein said water insoluble vinyl monomer has an alkyl chain containing 12 to 22 carbon atoms.

3. The terpolymer of claim 2 wherein said water soluble vinyl monomer is selected from acrylamide and methacrylamide.

* * * * *